(12) United States Patent
Mandeville, Jr. et al.

(10) Patent No.: US 7,871,061 B1
(45) Date of Patent: Jan. 18, 2011

(54) DUAL SPREADING LINK FOR GATE VALVES

(76) Inventors: Matthew Kevin Mandeville, Jr., 3541 Tice Creek Way, Sacramento, CA (US) 95833; Kenneth W Harrison, 8150 Winding Way, Fair Oaks, CA (US) 95628; Kirk Elis Carter, 9589 Four Winds Dr., Apt. 312, Elk Grove, CA (US) 95758; Howard Pon Lee, 9712 Tundra Swan Cir., Elk Grove, CA (US) 95757

( * ) Notice: Subject to any disclaimer, the term of this patent is extended or adjusted under 35 U.S.C. 154(b) by 872 days.

(21) Appl. No.: 11/697,138

(22) Filed: Apr. 5, 2007

(51) Int. Cl.
*F16K 31/44* (2006.01)

(52) U.S. Cl. .......................... 251/169; 251/201; 251/280

(58) Field of Classification Search ................. 251/167, 251/169, 195–202, 279
See application file for complete search history.

(56) References Cited

U.S. PATENT DOCUMENTS

| | | | |
|---|---|---|---|
| 961,594 A * | 6/1910 | Fischer ........................ | 251/169 |
| 2,626,774 A * | 1/1953 | Palmer ........................ | 251/169 |
| 2,841,361 A * | 7/1958 | Palmer ........................ | 251/169 |
| 3,208,717 A * | 9/1965 | Palmer et al. ................ | 251/169 |
| 3,237,916 A | 3/1966 | Bryant | |
| 3,408,042 A | 10/1968 | Vorkoeper | |
| 4,327,893 A * | 5/1982 | Bachmann et al. ........... | 251/169 |
| 4,328,947 A * | 5/1982 | Reimpell et al. ............. | 251/197 |
| 4,560,141 A | 12/1985 | Bosch | |
| 4,903,937 A * | 2/1990 | Jakubiec et al. ............. | 251/169 |
| 6,474,622 B2 | 11/2002 | Ito | |
| 6,612,546 B2 | 9/2003 | Young et al. | |
| 6,854,708 B2 * | 2/2005 | Contin et al. ................ | 251/167 |
| 7,004,453 B1 | 2/2006 | Cheng | |

* cited by examiner

*Primary Examiner*—John Bastianelli
(74) *Attorney, Agent, or Firm*—Bullivant Houser Bailey PC

(57) ABSTRACT

The invention is a dual spreading link mechanism for application with gate valves. The invention also extends to gate valves employing the inventive dual spreading link. In one application to pendulum gate valves, a valve carriage assembly moves in a pendular manner within a gate valve housing and operates to seal off the flow channel of the housing. The valve carriage assembly is comprised of a valve plate having a valve seat face for engaging with the housing in a sealing manner, a tensioning member which along with a plurality of clip springs provides a contracting force to the valve carriage assembly, and an actuating member which moves laterally within the carriage assembly to alternately spread and contract the assembly. The actuating member is stacked between the valve plate and tensioning member and the actuating member is coupled to the valve plate and tensioning member by a plurality of oblong rotatable links which comprise the dual spreading link.

13 Claims, 6 Drawing Sheets

DUAL SPREADING LINK FOR GATE VALVES

TECHNICAL FIELD

This invention relates to gate valves for use in conjunction with vacuum chambers and, more particularly, relates to a mechanism for opening and closing a gate valve.

BACKGROUND

Vacuum chambers are used in many useful industrial production environments, including vacuum casting and metallurgy, aerospace and satellite testing, automotive parts manufacturing, semiconductor and flat panel display manufacturing, research and medical processes. In these applications the work pieces involved are typically sensitive to contaminating matter and must be protected. A gate valve is often paired with a vacuum chamber to provide a means of entry and exit of the work piece from the chamber or to isolate the chamber from a vacuum source such as a vacuum pump. Gate valves are chosen in these applications because they present fewer moving parts than other types of valves. The reduction of moving parts reduces the possibility of work piece contamination from metal particulates shed from frictional engagement between parts.

Pendulum gate valves are especially desirable for vacuum chamber applications due to their compact configuration, high cycle rates, low maintenance and low level of metal particulate generation. U.S. Pat. No. 6,474,622 issued to Ito discloses a typical pendulum gate valve for use with a vacuum chamber having a multitude of roller pins which engage within an identical plurality of cam orifices imparted into a stationary bar member. A movable member containing the roller pins slides back and forth in relation to the bar member to actuate the mating of a valve plate with a housing of the pendulum gate valve. The added aspect of a plurality of rollers riding back and forth in a plurality of cam orifices lends to a higher probability of metal particulate contamination due to the frictional engagement of this many components. Furthermore, this pendulum gate valve only seals against the valve housing when the valve seat face of the valve plate is in contact with the vacuum environment inside of a vacuum chamber. The vacuum naturally suctions the valve seat face against the valve housing. This type of sealing is termed "easy way" sealing. The opposite sealing method has the valve seat face in contact with the atmosphere, such that the valve seat face is being drawn away from the valve housing by the difference in pressure between the vacuum side and atmosphere side. This type of sealing is termed "hard way" sealing.

Ideally, a gate valve mechanism would have the qualities of: 1) creating minimal particulate contamination; and 2) have the quality of being able to remain in a sealing condition whether the valve seat face is oriented as an easy way seal or a hard way seal. The present invention incorporates these two qualities.

The foregoing reflects the state of the art of which the inventor is aware, and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE INVENTION

The invention is a dual spreading link for opening and closing a valve and, more particularly, a dual spreading link for opening and closing gate valves used in conjunction with vacuum chambers. Additionally, the invention is also a gate valve which incorporates the inventive dual spreading link.

In its most rudimentary form, the dual spreading link is comprised of at least two oblong-shaped rotatable links wherein each link is rotatably coupled at their first ends to the same axis, the axis being attached to an actuating member. Additionally, the first link is rotatably coupled at its opposite end to a first member and the second link is rotatably coupled at its opposite end to a second member. As an example of application in a gate valve, the first member would be a valve plate having a valve seat face, and the second member would be a tensioning member wherein a tensioning means would impart greater tension upon the valve plate and tensioning member as spreading force is applied to the dual spreading link. An exemplary tensioning means would be a tension spring coupled to the valve plate and tensioning member. When spreading force is released, the tension spring contracts the dual spreading link and simultaneously draws the valve plate and tensioning means together.

In a second embodiment, the dual spreading link has the rotatable links attached at their first ends to parallel separate axes located on the actuating member. However, as with the first embodiment, the opposite ends of the first and second link are rotatably coupled to the first and second members respectively. The second embodiment has particular application to pendulum gate valves.

BRIEF DESCRIPTION OF THE DRAWINGS

The invention will be more fully understood by reference to the following drawings which are for illustrative purposes only.

DETAILED DESCRIPTION OF THE PREFERRED EMBODIMENTS

Figures 1, 2:
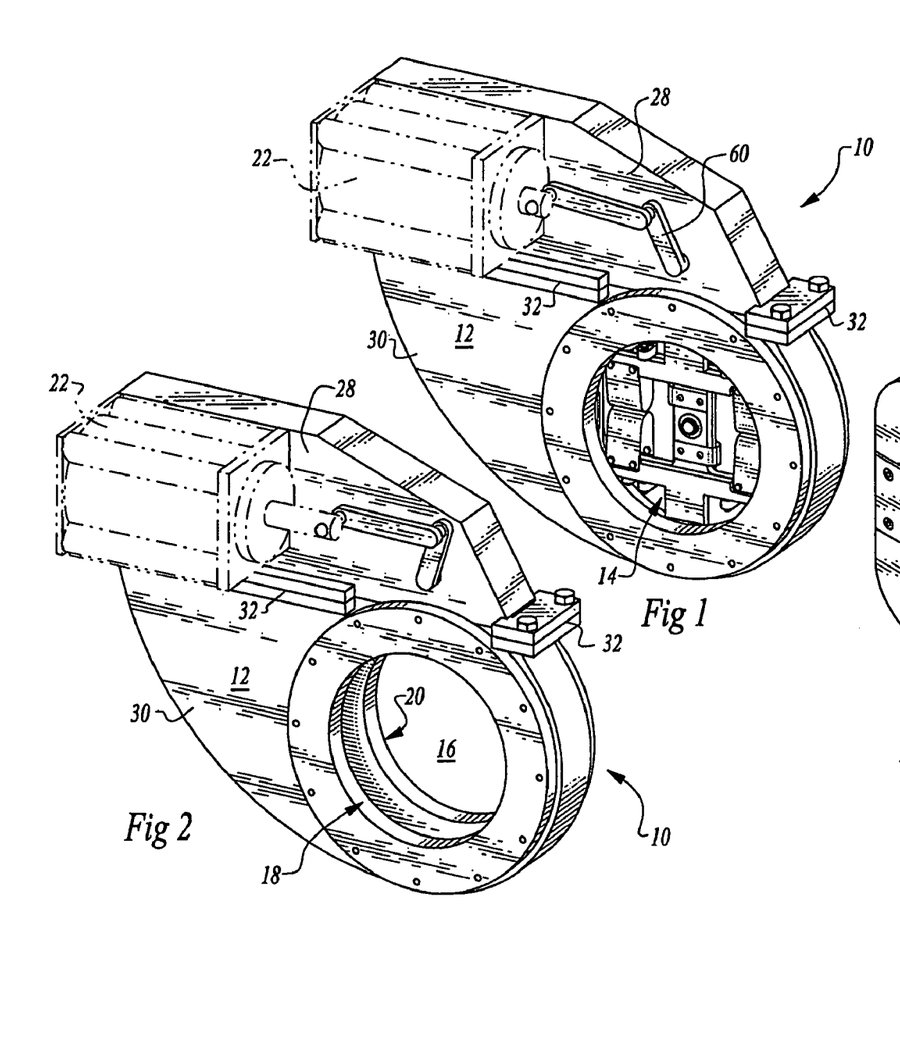
FIG. 1 is a perspective view of the inventive pendulum gate valve shown with the valve carriage assembly engaged with the housing in a sealing configuration.
FIG. 2 is a perspective view of the inventive pendulum gate valve shown with the valve carriage assembly disengaged from the housing and having been pivoted free of the flow channel.
Figure 3:
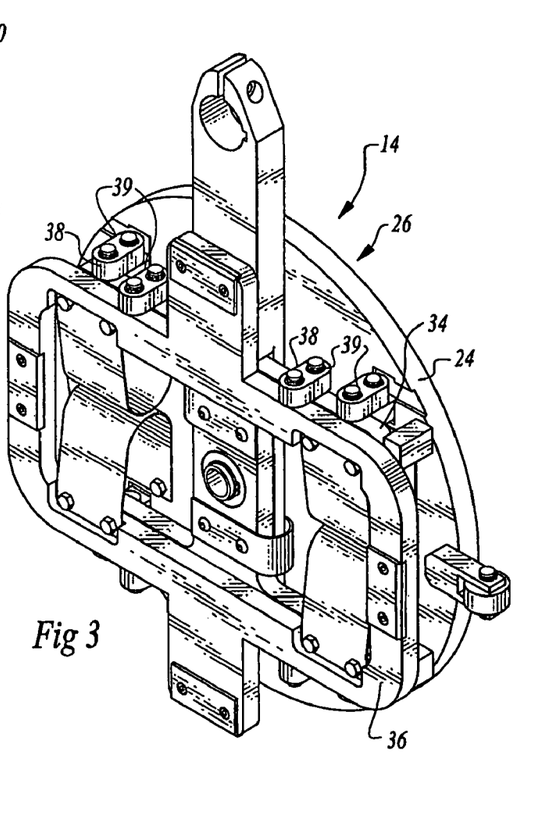
FIG. 3 is an elevated perspective view of the valve carriage assembly, shown in its spread orientation.

Referring to FIG. 1, the inventive pendulum gate valve 10 is shown with the general components of a housing containing a valve carriage assembly 14. In FIG. 1, the valve carriage assembly 14 is shown in a sealing configuration with the housing 12 in a position axially aligned with a flow channel 16 the flow channel being defined by the housing 12. FIG. 2 illustrates the valve carriage assembly 14 having moved from the position of FIG. 1 to a position disengaged from the housing 12 and completely free of the flow channel 16. The valve carriage assembly is not visible in this view as it has repositioned itself within the housing. This view shows the housing inlet 18 and outlet 20, as well as the flow channel 16 through the housing 12. The actuation between an engaged and disengaged position can be accomplished by a pneumatic, electric or hydraulic actuator 22 (shown in phantom), for example. Referring to FIG. 3, the valve carriage assembly 14 has a valve plate 24 which has a valve seat face 26 that seats against the inside of the valve housing 12 and seals off the flow channel 16. To seal off the flow channel 16, the valve carriage assembly 14, and particularly the valve plate 24, must be axially aligned with the flow channel 16 so that when the assembly is spreadably actuated the valve plate 24 will move axially in line with the flow channel 16 until it engages with the housing 12 in a "CLOSED" position. The housing 12 of the inventive pendulum gate valve 10 is preferably separable into two halves 28, 30 at a junction 32 as shown. A gasket (not shown) lines the bearing surfaces of the junction 32 to affect a tight seal between the two halves 28, 30 of the housing 12 and thereby prevent the loss of vacuum. The separable quality of the housing 12 allows the top half 28 of the housing to be removed for easy access to the valve carriage assembly 14. The housing and carriage assembly can be comprised of stainless steel, mild steel, aluminum or combinations of these metals, depending on the application and type of environment to which the gate valve would be subjected to.

Figure 4A:
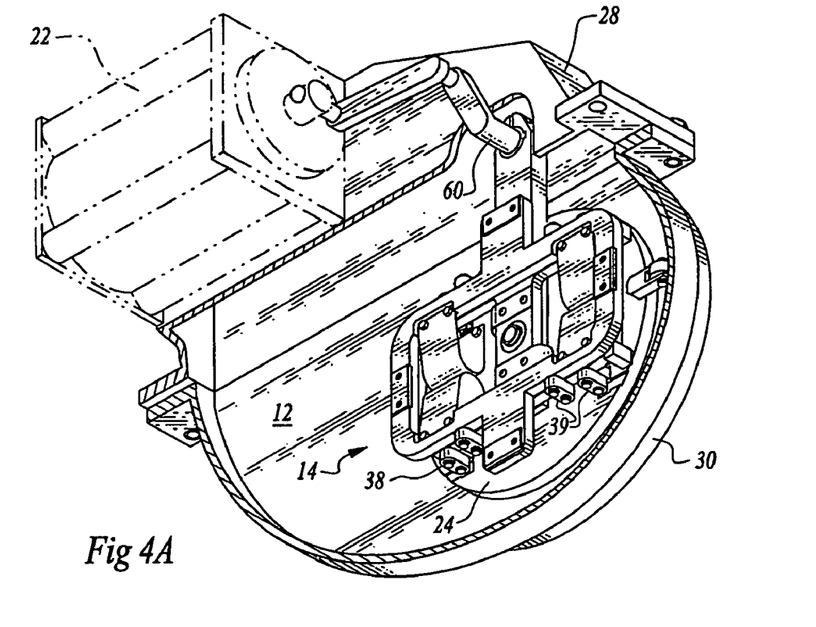
FIG. 4A is bottom cutaway view through the valve housing, showing the valve carriage assembly sealingly engaged with the valve housing.
Figure 4B:
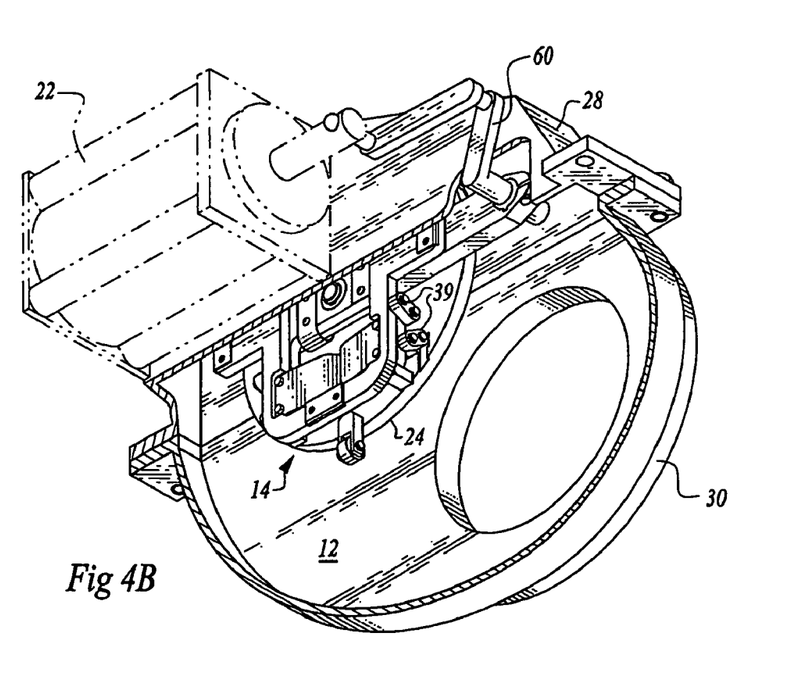
FIG. 4B is a bottom cutaway view through the valve housing, showing the valve carriage assembly disengaged from the valve housing.

Still referring to FIG. 3, the valve carriage assembly 14, is comprised of an actuating member 34 stacked between valve plate 24 and a tensioning member 36, these components being oriented in stacked parallel planes in relation to each other. Referring also to FIGS. 4A and 4B, the actuating member 34 is coupled to the valve plate 24 and tensioning member 36 by a plurality of oblong-shaped rotatable links 38, which aid in the expansion and contraction of the valve carriage assembly 14. Together the pair of rotatable links 38 from the inventive dual spreading link 39. In FIG. 4B, the valve carriage assembly is in a contracted orientation, with the valve plate 24 disengaged from the valve housing 12, and with the rotatable links 38 being positioned at an acute angle. In FIG. 4A, the valve carriage assembly 14 is shown with the valve plate 24 sealingly engaged against the inside surface of the valve housing 12. Here the rotatable links 38 have rotated to a locked orientation that is 91° (degrees) over-center, as will be further described herein. This is the optimum spread orientation for the valve carriage assembly 14 in that the lengths of the rotatable links 38 are brought to bear to provide a near-maximum separation distance between the tensioning member 36 and valve plate 24. The rotatable links 38 have a stacked configuration in that the links attaching the actuating member 34 to the tensioning member 36 share a common member (34) with the links attaching the actuating member 34 to the valve plate 24. This provides the inventive valve carriage assembly 14 with a dual spreading link 39, which allows the valve plate 24 to travel an axial distance within the housing 12 that is the sum of the full extension provided by each level of the stacked rotatable links 38. This allows a high degree of travel of the valve plate 24 without using a rolling or sliding mechanism like that of the prior art. The result is a mechanism for a gate valve which generates fewer particulates than prior art mechanisms.

Figure 5:
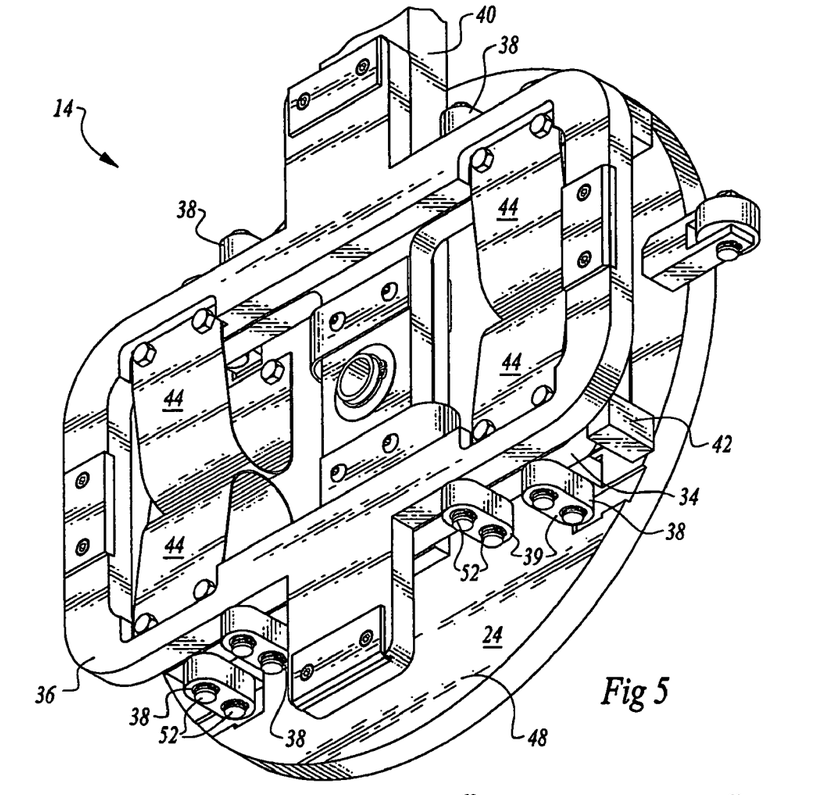
FIG. 5 is an elevated close up perspective view of the valve carriage assembly of the inventive pendulum gate valve shown in its spread orientation.

Referring now to FIG. 5, the valve carriage assembly 14 is shown separate from the housing 12. The actuating member 34 is attached to a pendulum arm 40, which extends beyond the carriage assembly 14 and attaches to an actuation mechanism 22, such as a pneumatic, electric or hydraulic actuator. The actuator 22 accomplishes the functions of both aligning the valve carriage assembly 14 with, and swinging it free of, the housing flow channel 16. The actuator 22 also accomplishes the function of moving the actuating member 34 left or right in a lateral motion between the valve plate 24 and tensioning member 36. In the preferred embodiment, rightward actuation of the actuating member 34 causes the valve carriage assembly 14 to achieve a spread orientation while moving the actuating member 34 left causes the valve carriage 14 to collapse, and attain a contracted orientation. A carriage stop 42 located to the right of the actuating member 34 prevents further travel of the actuating member, once the valve carriage assembly 14 has reached its desired spread orientation. While the actuating member is laterally movable, the valve plate 24 and tensioning member 36 remain stationary in the lateral direction. However, the valve plate 24 and tensioning member 36 are required to be movable in the vertical direction in order for the valve carriage assembly 14 to achieve a spread or contracted orientation. The valve plate 24 is coupled to the tensioning member 36 by a plurality of spring members 44, which provide a retraction force for drawing the valve plate and tensioning member toward each other. An exemplary spring member 44 in accordance with the invention is provided by a clip spring having a force of 5 lbs when the spread of the open end of the spring is one inch. However, the tension force of the spring clip varies with the size of the components of the carriage assembly in that larger valves may require stronger spring clips to adequately tension the larger components.

Figure 6A:
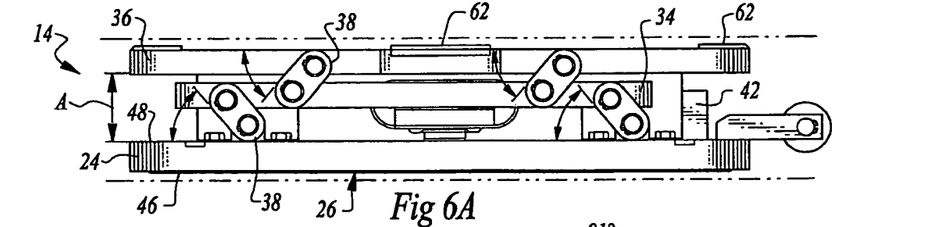
FIG. 6A is a close up end view of the valve carriage assembly showing the dual spread link mechanism in a contracted orientation.
Figure 6B:
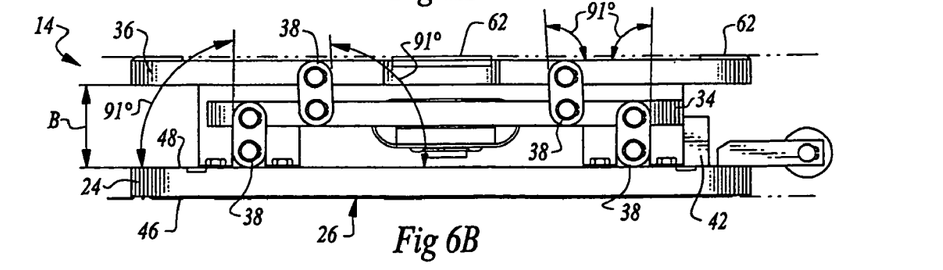
FIG. 6B is a close up end view of the valve carriage assembly showing the dual spread link mechanism in a spread orientation.

FIG. 6A is a close up view of the rotatable links 38 interacting with the actuating member 34, valve plate 24 and tensioning member 36. In this view, the rotatable links 38 are in their contracted position, as they would be when the valve plate 24 is disengaged from the valve housing 12. The valve plate 24 has a valve seat face 26 with a valve gasket 46 attached thereto. When the maximum spreading force is applied to the valve carriage assembly 14, the valve gasket 46 engages against the inside surface of the valve housing 12 surrounding the flow channel 16 and seals it tight against any further vacuum flow traveling through the flow channel. The inside surface of the housing 12 is typically machined smooth to achieve a valve seat for seating the gasket 46. The opposite face of the valve plate 24 constitutes the attachment face 48 wherein attachment points include a protruding pin 52 for attaching the rotatable links 38; here four links 38 attach the valve plate 24 to the actuating member 34. Actuating member 34 and tensioning member 36 also have pins 52 protruding externally to provide the attachments for four additional links. FIG. 6B shows a similar view as FIG. 6A with the valve carriage 14 at its desired extension and with the rotatable links 38 in their 91° over-center orientation. The actuating member 34 has traveled its full lateral distance at this point, and is resting against the carriage stop 42. This places the actuating member 34 in a laterally immovable status, thereby maintaining the carriage assembly 14 in a spread orientation and the valve seat face 26 sealingly engaged with the inside surface of the valve housing 12. This "locked over" status is maintained until reverse actuation releases the carriage assembly 14 from its sealed condition. Lock over occurs when the lateral travel of actuating member 34 contacts the carriage stop 42 and the pendulum arm 40 continues to travel so as to rotate the linkages 38 another 1° (degree) beyond perpendicular to the planes of 34, 24 and 36. When the dual spreading link 39 is placed in a locked over condition, it can maintain both a hard way seal and an easy way seal that are equally effective.

During lock over, the pendulum arm 40 continues to travel relative to the actuating member 34. Pendulum arm 40 rotates on a bearing assembly 54 (see FIG. 7) and a gap is maintained between pendulum arm 40 and the actuating member 34 by clip springs 56 which are tensioned to maintain a spreading force upon pendulum arm 40 and actuating member 34. The maintenance of gap helps reduce particulate contamination by preventing pendulum arm 40 from rubbing against actuating member 34. At the top of pendulum arm 40 is a hole 58 for attaching the operational end of an actuating arm 60 of actuator 22.

Still referring to FIGS. 6A and 6B, comparing the distance "A" of FIG. 6A with the distance "B" of FIG. 6B, illustrates the degree of axial travel provided by the dual spreading link 39 of the present invention. Also shown in these views are a plurality of pads 62, which help cushion the top surface of the tensioning member 36 against the opposite side of the valve housing 12. Pads 62 can be made of Teflon®, brass, bronze or any other vacuum-approved material that is softer than the material from which housing 12 is made.

Figure 7:
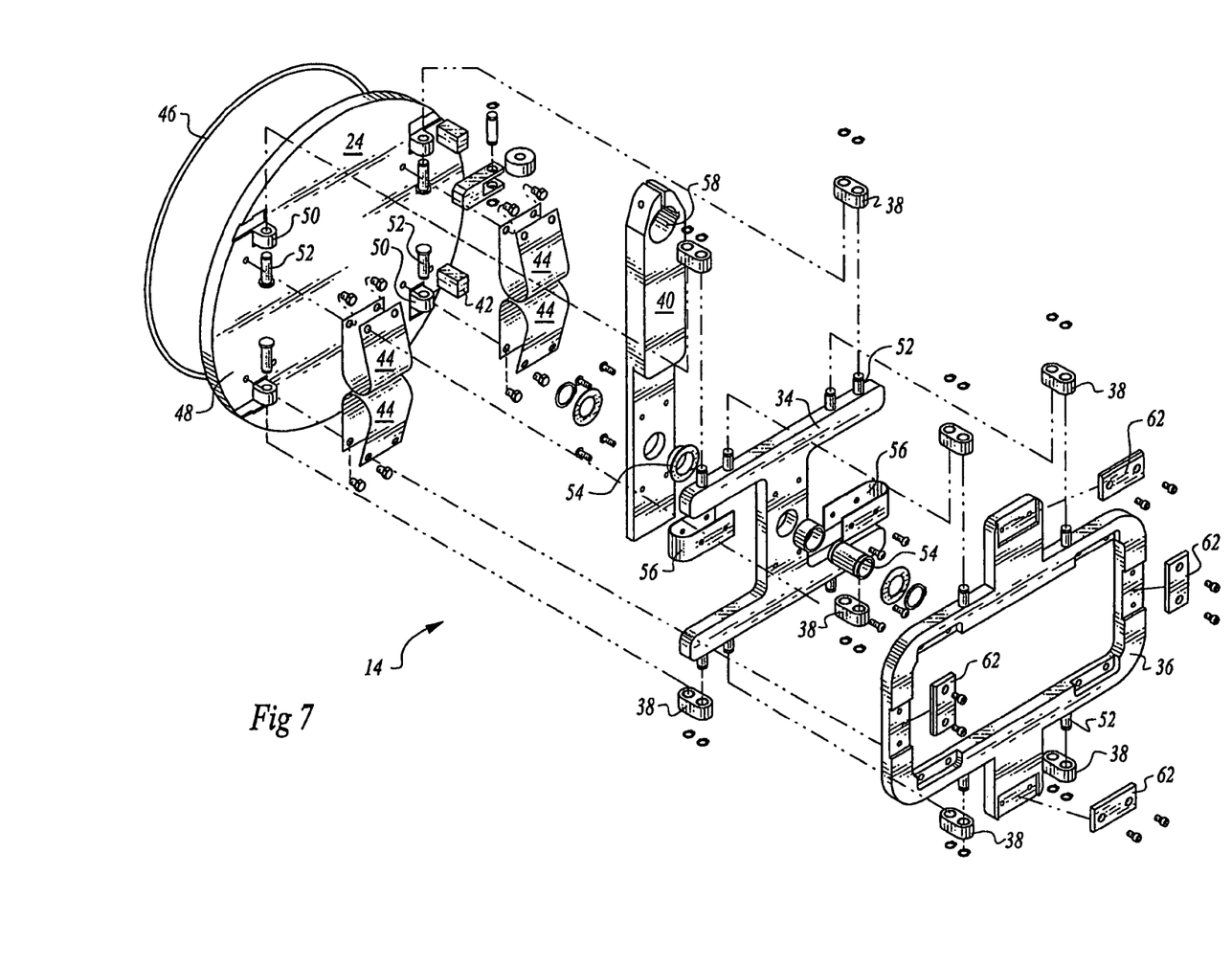
FIG. 7 is an exploded view of the valve carriage assembly.
Figures 8, 9, 10:
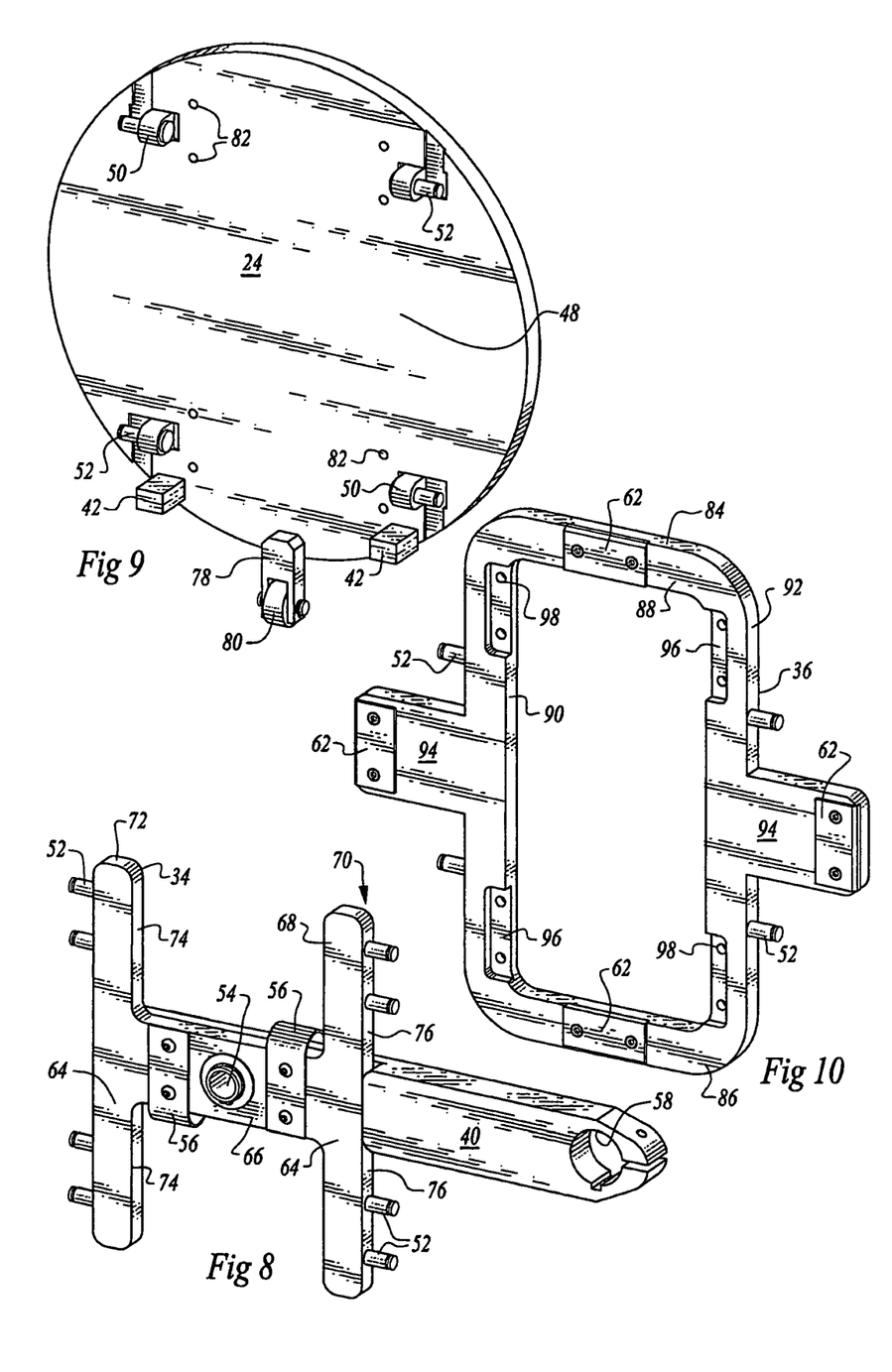
FIG. 8 is an elevated perspective view of the actuating member and pendulum arm assembly of the valve carriage assembly.
FIG. 9 is an elevated perspective view of the valve plate component of the valve carriage assembly.
FIG. 10 is an elevated perspective view of the tensioning member component of the valve carriage assembly.

FIG. 7 is an exploded view of the various components of the valve carriage assembly 14, which exposes these components for viewing. FIGS. 8, 9, and 10 illustrate separately the major valve carriage components of the actuating member and pendulum arm assembly, the valve plate and tensioning member, respectively.

FIG. 8 shows that the actuating member is comprised of separate parallel beams 64 joined by a center beam 66. The parallel beams have top 68 and bottom 70 sides, an end side 72, and interior 74 and exterior 76 sides. Each parallel beam 64 has four protruding pins 52 extending from the exterior sides 76 for a total of eight pins 52 protruding from the actuating member 34. In the preferred embodiment, the parallel beams 64 are provided with insertion holes imparted into the exterior sides 76 for inserting pins 52. Pendulum arm 40 is shown assembled to actuating member 34 via springs 56 and bearing assembly 54 as previously described.

FIG. 9 shows the attachment face 48 of valve plate 24, with attachment points 50 and four pins 52 protruding in an external direction there from. These pins 52 correspond with the outboard-positioned pins 52 located on the parallel beams 64 of actuating member 34, wherein four rotatable links 38 joins the valve plate 24 to the actuating member 34 via these corresponding pins 52. The attachment points 50 are placed around valve plate 24 to provide an even distribution of force transferred from the actuating member 34 to the valve plate 24, thus maintaining an even degree of axial travel of the valve plate 24 and even engagement of the valve plate gasket 46 with the valve seat on the valve carriage housing 12. A roller wheel bracket 78 is welded to the valve plate 24 protrudingly outward from the edge of the valve plate. A wheel 80 is attached to the bracket 78 and provides a means of stopping the pendular travel of the valve plate 24 and aligning it with the valve seat of the valve carriage housing 12. At its furthest end of travel, the wheel 80 contacts the interior of the housing 12 and stops the valve plate 24 and associated remainder of the valve carriage assembly 14 at a point that properly aligns the valve plate 24 with the valve seat on the housing 12. Finally, a plurality of threaded bolt holes 82 are distributed evenly in pairs about the valve plate 24 for attaching clip springs 44 thereto.

FIG. 10 shows the tensioning member 36 having first 84 and second 86 rounded ends, which each have a top surface 88, an interior side 90 and an exterior side 92. Placed evenly between the first and second ends are protruding wings 94 which include a Teflon® pad 62. The pads 62 are placed at the ends of wings 94 and along with pads 62 on top of the rounded ends 84, 86, and provide a contact surface for contacting the interior surface of the housing 12. When the carriage assembly 14 achieves a spread orientation, the pads 62 of tensioning member 36 contact the side of the housing opposite the valve seat side being contacted by valve plate gasket 46. Wings 94 help to maintain parallel contact between tensioning member 36 and the housing 12, because when tensioning member 36 properly contacts the side of the housing opposite the valve seat, it aligns the valve plate gasket with the valve seat. Four pins 52 protrude perpendicularly from the exterior sides 92 of the rounded ends 84, 86. In the preferred embodiment, the insertion holes for the pins 52 are imparted into the exterior sides 92 for inserting pins 52. These pins 52 correspond to the inboard-positioned pins 52 located on the parallel beams 64 of actuating member 34, wherein a rotatable link 38 joins the tensioning member 36 to the actuating member 34 via these corresponding pins 52. Four mounting recesses 96 are imparted into the top side 88 of the rounded ends 84, 86 for seating the ends of the four corresponding clip springs 44. Each recess 96 has a pair of threaded bolt holes 98 for attaching the four clip springs 44 to the tensioning member 36.

Figure 11:
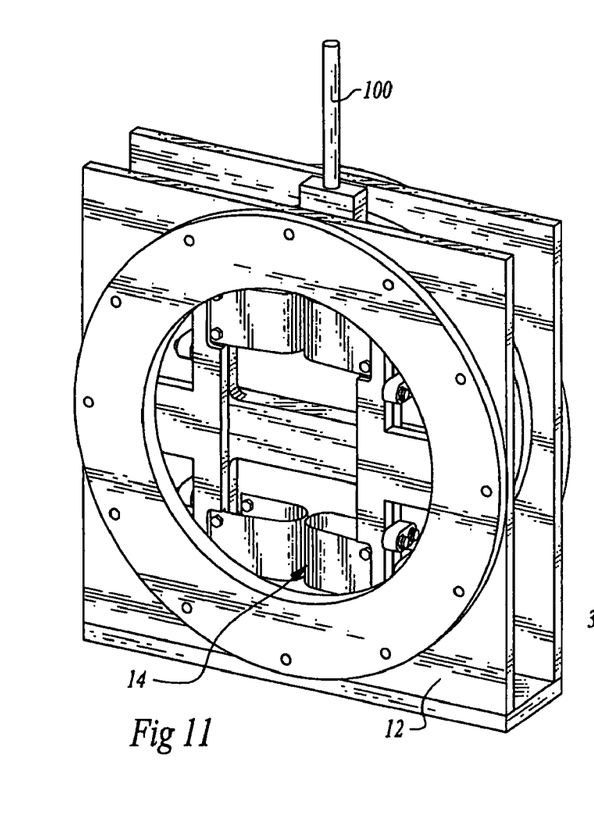
FIG. 11 is an elevated perspective view of a second embodiment of the inventive gate valve.
Figure 12:
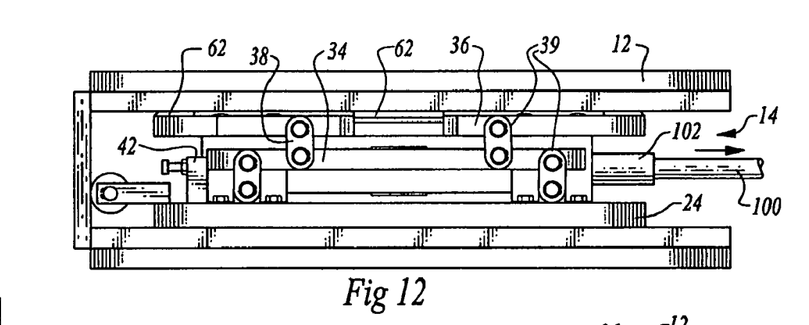
FIG. 12 is a side view of the embodiment of FIG. 11, shown in a sealed condition.
Figure 13:
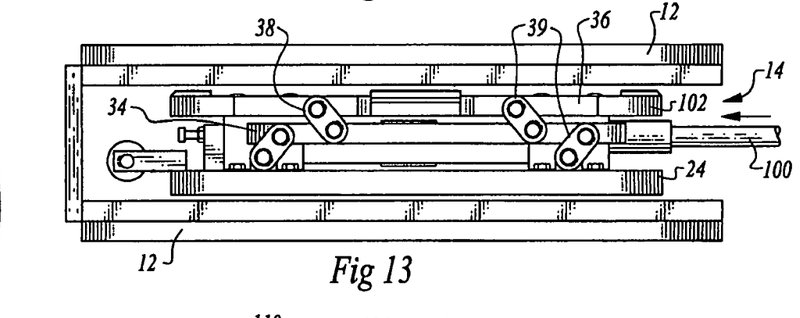
FIG. 13 is a side view of the embodiment of FIG. 11, shown in an unsealed condition.

FIG. 11 shows an alternate embodiment of a stationary gate valve which employs the inventive dual spreading link 39. The valve carriage assembly 14 is not attached to a swinging pendulum arm and as such, remains stationary, in place, within the valve housing 12. Lateral movement is imparted to the actuating member by an actuating rod 100, rather than from a pendulum arm having a lock over mechanism. The actuating rod 100 is actuated by a pneumatic, hydraulic or electric actuator (not shown in this view). The actuating member 34 has a threaded coupler 102 welded to it wherein the threaded end of the actuating rod 100 can be attached. FIG. 12 is a side view of the alternate embodiment shown with the valve carriage assembly 14 in a sealing condition against the valve housing 12. In the sealed condition the rotatable links 38 are placed in their 91° over-center orientation, as previously mentioned, and held there by the linear force imparted to the actuating member 34 by the actuator. In this view it is clearly shown how the valve plate 24 and pads 62 of the tensioning member are contacting the opposite sides of the valve housing 12 to maintain a vacuum-tight seal. FIG. 13 is a side view of the alternate embodiment shown with the valve carriage assembly 14 unsealed from the valve housing 12. In this view, the actuating rod 100 has been actuated in the direction opposite that shown in FIG. 12, causing the actuating member 34 to move in a direction to cause the valve carriage assembly 14 to contract and the rotatable links 38 to return to their acute-angled orientations.

Figures 14A, 14B:
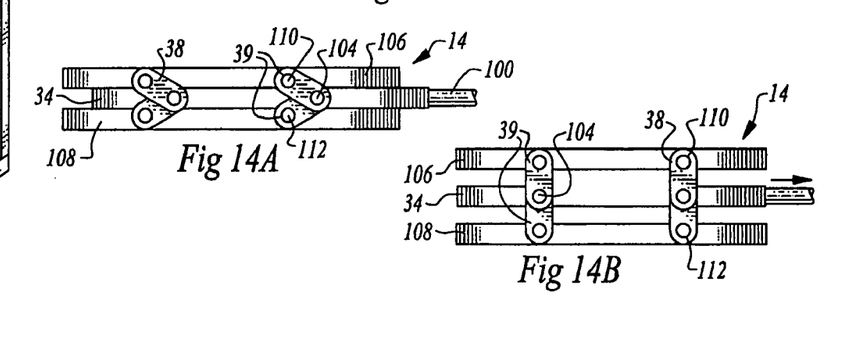
FIG. 14A is a side view of an alternative embodiment of the dual spreading link mechanism wherein the dual links share a common axis, this view showing the valve carriage in a contracted orientation.
FIG. 14B is side view of the dual spreading link embodiment of FIG. 14A, this view showing the valve carriage in a spread orientation.

FIG. 14A is an alternate embodiment of a dual spreading link 39 wherein the rotatable links 38 share the same axis of rotation 104. This view shows the valve carriage assembly 14 in a contracted orientation with a first rotatable link sharing the same axis 104 with the second rotatable link to comprise the dual spreading link 39. The first rotatable link 38 is rotatably coupled to the first member 106 at axis 110 while the second rotatable 38 link is rotably coupled to the second member 108 at axis 112. Either the first or second member could be a valve plate having a valve seat face, for example. An actuating member 34 occupies a center location between the first and second members 106,108, as noted in the previous embodiments. The actuating member 34 would be attached to an actuating rod 100 in the same manner as noted previously in describing the gate valve embodiment of FIG. 11-13.

FIG. 14B illustrates the embodiment of FIG. 14A in a fully spread orientation with the actuating member 34 separated from the first and second members 106, 108 and with the dual links 39 oriented at maximum spread for this embodiment. If used in a gate valve, this orientation would signify a closed position of the gate valve, whereas the contracted orientation of FIG. 14A signifies an open position.

Finally, although the description above contains much specificity, this should not be construed as limiting the scope of the invention, but as merely providing illustrations of some of the presently preferred embodiments of this invention. This invention may be altered and rearranged in numerous ways by one skilled in the art without departing from the coverage of any patent claims which are supported by this specification.

The invention claimed is:

1. A pendulum gate valve, comprising:
   a valve housing defining a flow channel;
   a valve carriage assembly movable within said valve housing from a fully open position to a position axially aligned with the flow;
   said valve carriage assembly including an essentially circular valve plate, an actuating member and a tensioning member, said actuating member being positioned between said valve plate and said tensioning member, said valve plate having a valve seat face and an attachment face opposite said valve seat face, said attachment face for attaching to said actuating member by a first plurality of at least four rotatable links, said actuating member further attaching to said tensioning member by a second plurality of at least four rotatable links, said actuating member communicating with a pendulum arm wherein the application of lateral force to said pendulum arm causes said actuating member to travel laterally in a first direction, said travel of said actuating member forcing both said first and second plurality of rotatable links to travel from an offset orientation to a vertically spread orientation, thereby causing said valve plate to travel an axial distance until said valve seat face is sealingly engaged with said valve housing;
   said actuating member having a first angular orientation in said fully open position and a second angular orientation in said position axially aligned with the flow;
   wherein said first plurality of rotatable links are located at points around said attachment face so as to provide an even distribution of force transferred from said actuating member to said valve plate; and
   wherein said tensioning member is attached to said attachment face of said valve plate by a plurality of spring members, said spring members vertically spreading and achieving a tensioned state upon said valve plate traveling axially toward said valve housing, whereby said tensioned state provides an inward force for subsequently drawing the valve plate inward toward the actuating member and away from the valve housing.

2. The pendulum gate valve as recited in claim 1, wherein the application of releasing lateral force upon said pendulum arm causes said actuating member to travel laterally in a second direction opposite from said first direction, thereby causing said rotatable links to return to said offset orientation.

3. The pendulum gate valve as recited in claim 2, wherein said spring members impart a uniform compressive force upon said valve plate, thereby causing said valve plate to axially retreat from said valve housing upon the application of releasing lateral force upon said pendulum arm.

4. A pendulum gate valve, comprising:
   a valve housing defining a flow channel;
   a valve carriage assembly movable within said valve housing from a fully open position to a position axially aligned with the flow;
   said valve carriage assembly further comprising an essentially circular valve plate having a valve seat face and an attachment face opposite said valve seat face, said valve seat face for being sealingly applied against said valve housing to seal off said flow channel, said attachment face attaching to an actuating member by a first plurality of at least four rotatable links, said actuating member further being attached to a tensioning member by a second plurality of at least four rotatable links, said actuating member being stacked in between said valve plate and tensioning member, said first plurality of rotatable links separating said valve plate from said actuating member, said second plurality of rotatable links separating said actuating member from said valve plate;
   said actuating member having a first angular orientation in said open position and a second angular orientation in said position axially aligned with the flow;
   wherein said first plurality of rotatable links are located at points around said attachment face so as to provide an even distribution of force transferred from said actuating member to said valve plate; and
   wherein said tensioning member is attached to said attachment face of said valve plate by a plurality of spring members, said spring members vertically spreading and achieving a tensioned state upon said valve plate traveling axially toward said valve housing, whereby said tensioned state provides an inward force for subsequently drawing the valve plate inward toward the actuating member and away from the valve housing.

5. The pendulum gate valve as recited in claim 4, wherein said actuating member is attached to a pendulum arm, wherein applying force in a first direction to said pendulum arm causes said actuating member to travel in a first direction forcing both said first and second plurality of rotatable links to travel from an offset compressed orientation to a vertically spread orientation, thereby causing said valve plate to travel an axial distance until said valve seat face is sealingly engaged with said valve housing.

6. The pendulum gate valve as recited in claim 5, wherein applying force in a second direction to said pendulum arm causes said actuating member to travel in a second direction opposite from said first direction of travel of said actuating member, thereby causing said valve plate to axially retreat from said valve housing.

7. A pendulum gate valve, comprising:
   a valve housing defining a flow channel;

a valve carriage assembly rotatable within said valve housing from a fully open position to a position axially aligned with the flow;

said valve carriage assembly including a valve plate, an actuating member and a tensioning member, said actuating member being positioned between said valve plate and, said tensioning member, said valve plate having a valve seat face and an attachment face opposite said valve seat face, said attachment face for attaching to said actuating member by a first plurality of at least four rotatable links, said actuating member further attaching to said tensioning member by a second plurality of at least four rotatable links, said actuating member communicating with a pendulum arm wherein the application of lateral force to said pendulum arm causes said actuating member to travel laterally in a first direction, said travel of said actuating member forcing both said first and second plurality of rotatable links to travel from an offset orientation to a vertically spread orientation, thereby causing said valve plate to travel an axial distance until said valve seat face is sealingly engaged with said valve housing;

wherein said first plurality of rotatable links are located at points around said attachment face so as to provide an even distribution of force transferred from said actuating member to said valve plate; and wherein said tensioning member is attached to said attachment face of said valve plate by a plurality of spring members, said spring members vertically spreading and achieving tensioned state upon said valve plate traveling axially toward said valve housing, whereby said tensioned state provides an inward force for subsequently drawing the valve plate inward toward the actuating member and away from the valve housing.

8. The pendulum gate valve as recited in claim 7, wherein said actuating member is attached to a pendulum arm, wherein applying force in a first direction to said pendulum arm causes said actuating member to travel in a first direction forcing both said first and second plurality of rotatable links to travel from an offset compressed orientation to a vertically spread orientation, thereby causing said valve plate to travel an axial distance until said valve seat face is sealingly engaged with said valve housing.

9. The pendulum gate valve as recited in claim 8, wherein applying force in a second direction to said pendulum arm causes said actuating member to travel in a second direction opposite from said first direction of travel of said actuating member, thereby causing said valve plate to axially retreat from said valve housing.

10. The pendulum gate valve as recited in claim 7, wherein said valve plate is essentially circular.

11. The pendulum gate valve as recited in claim 7, wherein said first plurality of rotatable links, attached to points around said attachment face, maintain an even degree of axial travel of said valve plate and an even engagement of said valve plate with said valve housing.

12. The pendulum gate valve as recited in claim 1, wherein said first plurality of rotatable links, attached to points around said attachment face, maintain an even degree of axial travel of said valve plate and an even engagement of said valve plate with said valve housing.

13. The pendulum gate valve as recited in claim 4, wherein said first plurality of rotatable links, attached to points around said attachment face, maintain an even degree of axial travel of said valve plate and an even engagement of said valve plate with said valve housing.

* * * * *